Sept. 6, 1949.  W. LEHNERT  2,481,315
VARIABLE RATIO DRIVE
Filed Jan. 25, 1946  3 Sheets-Sheet 1

INVENTOR.
WAYNE LEHNERT
BY *Victor J. Evans & Co.*
ATTORNEYS

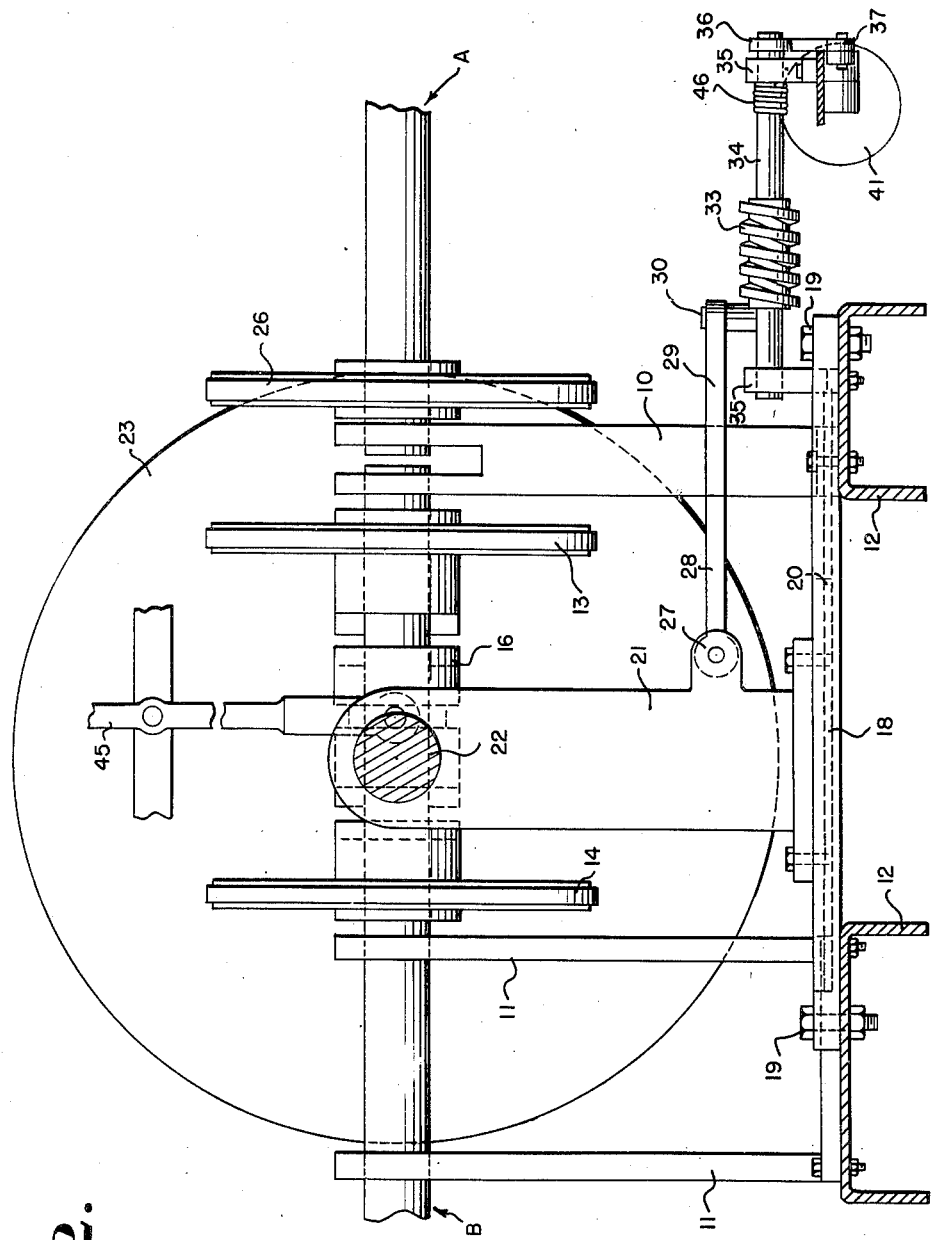

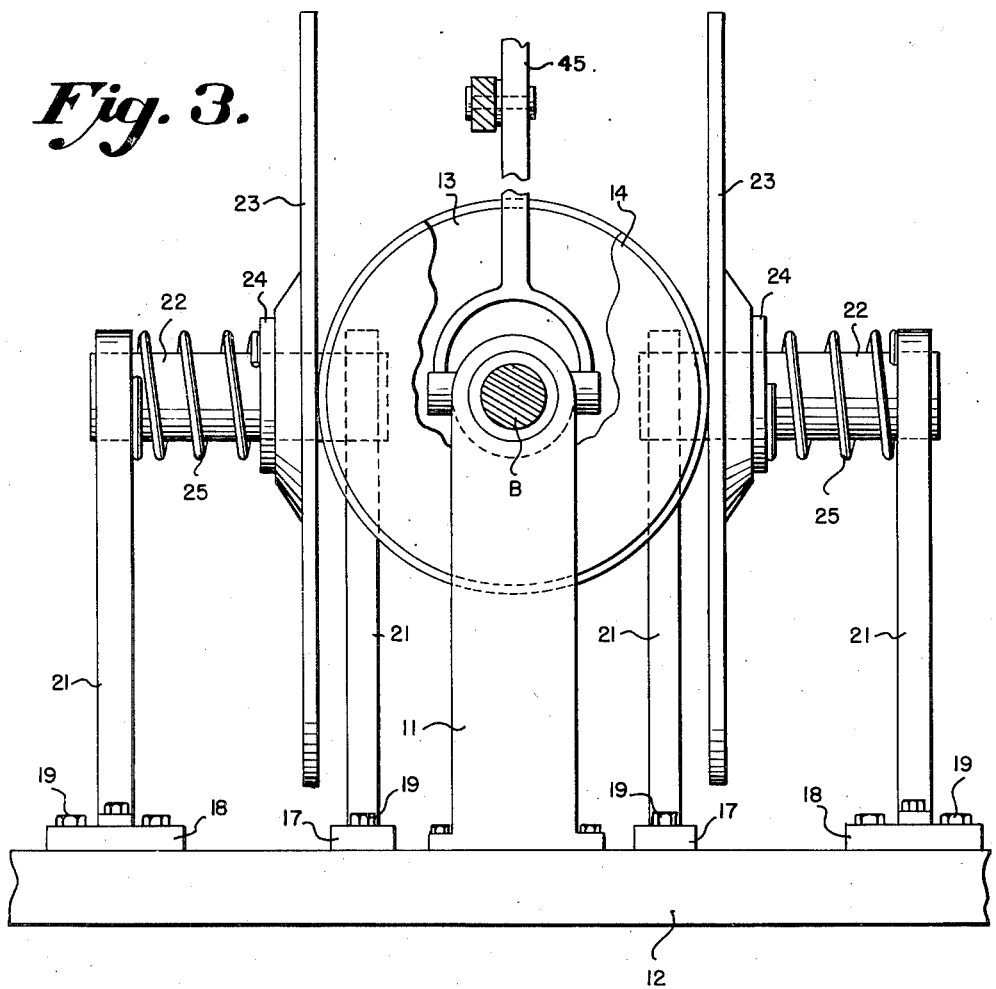
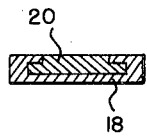

Patented Sept. 6, 1949

2,481,315

UNITED STATES PATENT OFFICE 2,481,315

VARIABLE RATIO DRIVE

Wayne Lehnert, Peotone, Ill.

Application January 25, 1946, Serial No. 643,263

2 Claims. (Cl. 74—196)

The invention relates to a power transmission mechanism, and more especially to a friction gear transmission for motor vehicle construction.

The primary object of the invention is the provision of mechanism of this character, wherein through vacuum within the motor a friction power transmission is effected, and automatically a change of speed takes place in accordance with the load variation, the transmission being reversible at the will of the operator of the vehicle.

Another object of the invention is the provision of mechanism of this character, wherein the transmission of motion from a driving source or power unit to a driven source or unit will be had in a smooth, quiet and effective manner, without any lost motion, and at the same time an operator can manually control and vary the relation of speeds between the driving and driven mediums, as well as a reversal of directional motion, without the use of gearing of the toothed type.

A further object of the invention is the provision of mechanism of this character, wherein the use of toothed gear transmission is entirely dispensed with, and the speed change between the driving and driven mediums is automatically effected corresponding to load conditions present in a motor vehicle, the mechanism being of novel construction and is unique in the assembly of the parts thereof.

A still further object of the invention is the provision of mechanism of this character, which is simple in construction, thoroughly reliable and efficient in operation, strong, durable, positive in the working thereof, compact, readily and easily assembled, and inexpensive to manufacture and install.

With these and other objects in view the invention consists in the features of construction, combination and arrangement of parts as will be hereinafter more fully described, illustrated in the accompanying drawings, which disclose the preferred embodiment of the invention, and pointed out in the claims hereunto appended.

In the accompanying drawings:

Figure 2 is a sectional view taken approximately on the line 2—2 of Figure 1, looking in the direction of the arrows.

Figure 3 is a view similar to Figure 2 taken at right angles thereto.

Figure 4 is a sectional view taken on the line 4—4 of Figure 1, looking in the direction of the arrows.

Similar reference characters indicate corresponding parts throughout the several views in the drawings.

Figure 1:
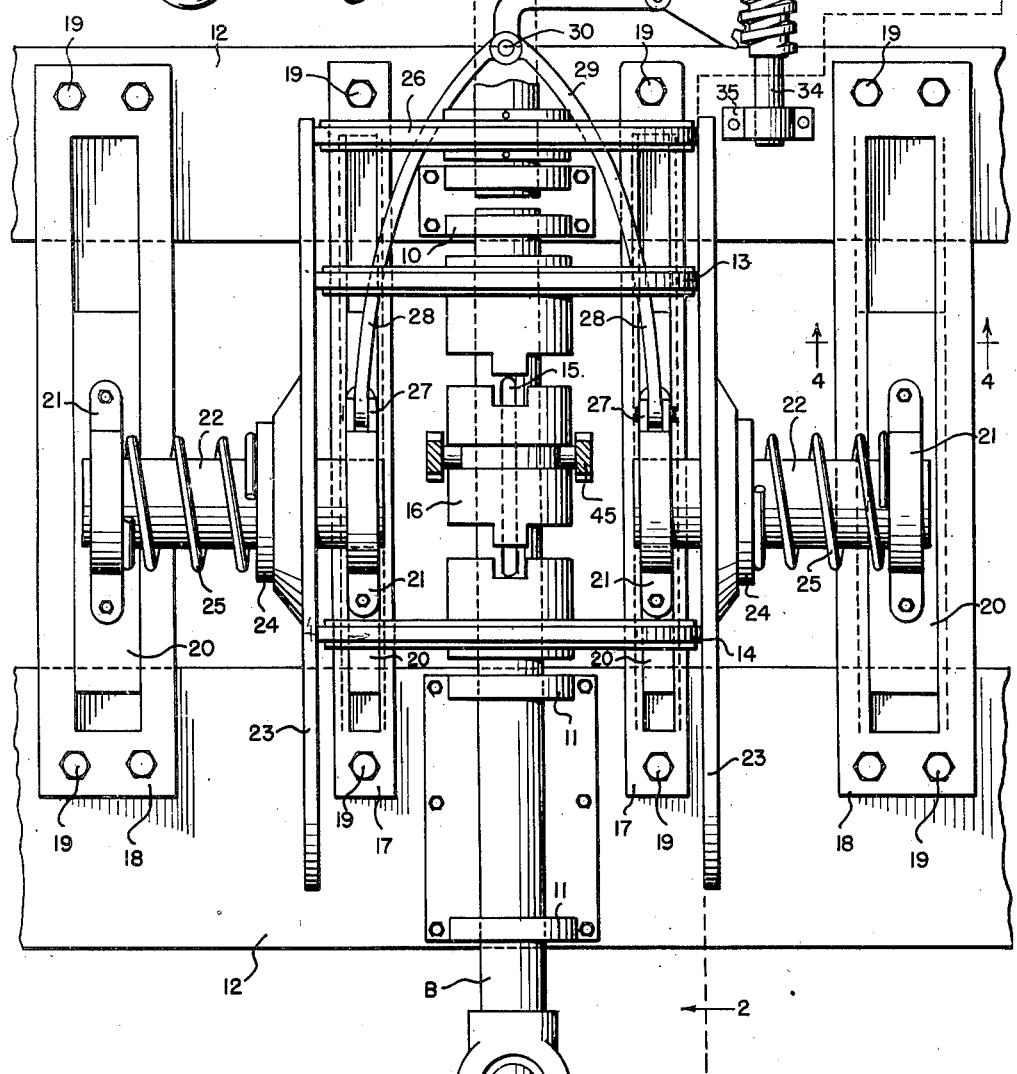
Figure 1 is a fragmentary plan view of the mechanism constructed in accordance with the invention.

Referring to the drawings in detail, the mechanism constituting the present invention relates to a variable speed friction gear transmission, comprising a power unit shaft, only a portion thereof designated generally at A, and a driven shaft, a portion of the latter being denoted at B, and these shafts are mounted in the respective stationary bearings 10, and 11, which are supported in a chassis frame, a portion of which is denoted at 12, of a motor vehicle, not shown.

Loose for free rotation on the driven shaft B are spaced disk-like friction gears 13 and 14, respectively, while splined at 15 between these gears is a clutch sleeve 16 adapted for sliding movement on the shaft B to engage with and disengage from either of the gears 13 and 14, alternately, and in this manner a reversal of the direction of rotation of the driven shaft will be had, as hereinafter described.

Parallel with and at opposite sides of the lay of the driving and driven shafts A and B, as well as spaced therefrom, are inside and outside tracks 17 and 18, respectively, which are made secure by fasteners 19, and fitted to these tracks are runners 20 provided with bearings 21 for stud arbors 22, which are disposed at right angles to the shafts at opposite sides thereof and laterally confront the same. Loose on these arbors 22 are change speed friction disks 23, which are backed by thrust bearings 24, and against the latter work coiled tensioning springs 25 trained about the arbors 22 with contact against the outer runner bearings 21 to hold such disks 23 in contact at all times with the peripheries of the gears 13 and 14, whether clutched to or unclutched from the shaft B.

The driving shaft A has fixed thereto a friction disk driving gear 26, which meshes with the disks 23 at all times. Connected by pivots 27 to runners 20 are the arms 28 of a shift yoke 29, these arms being pivoted at 30 to a throw elbow 31 having a worm threaded sector 32, meshing with a worm feed screw 33 formed on a turning shaft 34 fitting suitable bearings 35 stationarily supported.

The shaft 34 has a crank arm 36 attached thereto, and to the latter is pivoted at 37 to the offset portion 38 of a piston stem or rod 39, its piston 40 operating in the cylinder 41 of a vacuum operated motor or other like device, which is suitably supported in the chassis frame 12, the suction pipe line 42 of which has connection with the suction manifold, not shown, of the vehicle motor. The line 42 is fitted with a bleed valve device 43 operative by the motor vehicle clutch pedal 44, as best seen in Figure 1 of the drawings. When the pedal 44 is depressed, the valve 43 is opened to thereby actuate the piston 40. The motor or other like device having the piston 40 and the cylinder 41 automatically controls the throw of the disks 23, to bring the same toward and from the center of the gears 13, 14 and 26 accordingly to the load imposed on the motor by the vehicle, and in this way regulating the speed changes of motions between the motor drive shaft A and the driven shaft B.

The clutch sleeve 16 is manually thrown by a hand throw lever 45, for reverse driving action of the transmission mechanism.

The piston 40 for its return stroke within the cylinder when suction or vacuum action thereon is relieved, has acting thereon a tensioning spring 46 connected to the shaft 34, as best seen in Figure 1 of the drawings.

When the motor is subjected to a light load the vacuum is the greatest in accordance therewith, so that the gears 13 and 26 approach the center of the disks 23, and gear 14 approaches the outer edge of disks 23. When the load increases the gears recede from their positions of the said disks, and in this manner the driven speed automatically varies between the driving and driven shafts congruous with the load imposed by the vehicle in the driving thereof, either forwardly or backwardly. The vacuum effect is manually controlled by an operator of the vehicle through the use of the motor vehicle clutch pedal 44, as before described.

What is claimed is:

1. Mechanism of the character described, comprising a rotary driving element, a rotary driven element, opposed friction disks parallel with and confronting the driving and driven elements, friction gears loose on the driven element and engaging the disks, at opposite sides of the centers thereof, means for clutching either gear to the driven element, and friction gear connections between the driving element and the said disks.

2. The invention as in claim 1 including means for varying the ratio of speed between the driving element and the driven element comprising means for varying the position of the disks along a direction parallel to the axis of the driving element.

WAYNE LEHNERT.

REFERENCES CITED

The following references are of record in the file of this patent:

UNITED STATES PATENTS

| Number | Name | Date |
|---|---|---|
| 478,959 | Gordon | July 12, 1892 |
| 967,279 | Whitcomb | Aug. 16, 1910 |
| 2,115,097 | Durham | Apr. 26, 1938 |
| 2,116,590 | Tyler | May 10, 1938 |